United States Patent
Yang

(10) Patent No.: US 8,773,456 B2
(45) Date of Patent: Jul. 8, 2014

(54) HALFTONE IMAGE GENERATION METHOD AND IMAGE PROCESSING SYSTEM AND COMPUTER PROGRAM PRODUCT THEREOF

(75) Inventor: Chang-Jing Yang, Taoyuan Hsien (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 267 days.

(21) Appl. No.: 13/472,118

(22) Filed: May 15, 2012

(65) Prior Publication Data

US 2013/0307867 A1    Nov. 21, 2013

(51) Int. Cl.
*G09G 5/02* (2006.01)
(52) U.S. Cl.
USPC .......................................................... 345/596
(58) Field of Classification Search
None
See application file for complete search history.

(56) References Cited

U.S. PATENT DOCUMENTS 7,961,962 B2 *   6/2011   Cittadini et al. ............... 382/237
8,130,192 B2 *   3/2012   Feng ............................. 345/107

* cited by examiner

*Primary Examiner* — Phi Hoang
*Assistant Examiner* — Mohammad H Akhavannik
(74) *Attorney, Agent, or Firm* — Muncy, Geissler, Olds & Lowe, P.C.

(57) ABSTRACT

A halftone image generation method used in a system including a quantizer, a subtracter, a post-dithering module and an adder for generating a halftone image is disclosed. First, an original image including original pixels having original pixel values is received by the quantizer and a quantized image including quantized pixels having quantized pixel values according to a predetermined threshold is generated by the quantizer. The quantized pixel values from the original pixel values are subtracted by the subtracter so as to generate quantization error values. A post-dithering process is performed by the post-dithering module to generate dither values by using the quantization error values. The quantized pixel values of the quantized image are added to the dither values by the adder. Finally, the halftone image including halftone pixels having halftone pixel values is generated.

9 Claims, 11 Drawing Sheets

HALFTONE IMAGE GENERATION METHOD AND IMAGE PROCESSING SYSTEM AND COMPUTER PROGRAM PRODUCT THEREOF

BACKGROUND OF THE INVENTION

1. Field of the Invention

The invention relates to image generation methods and related image processing systems, and more particularly, to a halftone image generation method and a related image processing system for converting a grayscale image into a halftone image.

2. Description of the Related Art

Digital halftoning is a technique employing digital image processing to produce a halftoned input digital image from an input digital image. An input digital image normally consists of pixels of discrete values typically ranging from 0 to 255. To reproduce this image on an output device capable of printing dots of one gray level (e.g. black), it is necessary to convert the input digital image to a halftoned digital image using some form of halftoning techniques. Halftoning methods rely on the fact that for sight of an observer, vision will be spatially averaged over some local area of the halftoned digital image so that intermediate gray levels can be created by turning some of the pixels "on" and some of the pixels "off" in some small region of the halftoned digital image. The fraction of the pixels that are turned on will determine the apparent gray level.

Existing digital halftoning techniques can be classified into three main categories: (1) dithering, (2) error diffusion, and (3) iterative optimization. Each of these techniques, as well as combinations of the techniques, has its own advantages and shortcomings. Generally speaking, since the iterative optimization technique demands a much higher computational procedure, it is mainly used for academics. Dithering and error diffusion are two categories that have been researched more extensively as a practical approach for industrial implementation. A brief review of these three methods is as follows.

(1) Dithering

Ordered dithering can be classified into two categories. The two categories are clustered-dot and dispersed-dot ordered dithering. FIG. 1(a) shows a 4×4 clustered-dot ordered dithering pattern and FIG. 1(b) shows a 4×4 dispersed-dot ordered dithering pattern. Clustered-dot ordered dithering uses variable-size halftone dots at a fixed spacing. The addition of device pixels at a dot's outer edge increases the covered area and the size of the dot. When viewed from a distance, the larger the dot size, the greater the area covered and the darker the image area. Dispersed-dot ordered dithering is preferred when the display device is capable of displaying an isolated black or white pixel. It uses a fixed-size, smaller dot at variable spacing to achieve the same effect as clustered-dot ordered dithering. Variation in dot spacing varies the number of dots in a given area, or dot frequency. In such a technique, a denser dot distribution provides a darker image area. On some display devices, each dot comprises up to four or five device pixels. Dispersed-dot ordering provides a dot distribution based upon the shade variations in the original image. The dot distribution is optimized to be the best representation possible for the particular display device.

(2) Error Diffusion

Error diffusion is an adaptive algorithm that produces patterns with different spatial frequency content depending on the input digital image value. FIG. 2 shows a prior art block diagram 200 depicting a basic error diffusion technique. This technique is disclosed in more detail in "An Adaptive Algorithm for Spatial Greyscale," Proceedings of the Society for Information Display, volume 17, pp. 75, 1976 by R. W. Floyd and L. Steinberg. For purpose of illustration it will be assumed that the pixels of the input digital image span the range from 0 to 255. As shown in FIG. 2, the pixels of an input digital image $P_i$ are thresholded in a threshold block 201 to produce thresholded pixels. The threshold block 201 provides a signal having a 0 for any pixel of the input digital image below the threshold, and a 255 for any pixel of the input digital image above the threshold. A difference signal generator 202 receives the signal representing the pixel of the input digital image from the threshold block 201 and also from the output of an adder 204, which will be discussed later. The difference signal generator 202 produces a difference signal representing the error 205 introduced by the thresholding process. The difference signal is multiplied by a series of error feedback weights in an error filter 203, and is provided to the adder 204 which adds the weighted difference signal to the nearby pixels that have yet to be processed. This insures that the arithmetic mean of the pixels of the halftone digital image is preserved over a local image region.

(3) Iterative Optimization

Iterative optimization methods attempt to minimize the perceived error between the continuous-tone image and the halftoned image according to some underlying models, such as the human visual system (HVS). The error is usually calculated by a weighted least square approach. Halftone images derived by this type of techniques usually have high quality at the cost of computational complexity. The iterative optimization process is shown in FIG. 3.

As the spatial resolution of an electrophorotic display (EPD) is much lower than a printer, the ordered dithering method has the lowest computation among the three methods but yields images of poor quality. The error diffusion method and the iterative optimization method provide a more pleasing image. However, the computational resources required become a major issue when these methods are used in a hand-held electronic device. For example, the computational complexity of an error diffusion method using an 8-bit recursive computation is a large loading factor in an EPD system. Therefore, it is desirable to provide an improved system and method to reduce computational complexity and provide higher image quality.

BRIEF SUMMARY OF THE INVENTION

It is therefore an objective to provide halftone image generation methods and image processing systems to convert the original grayscale image into a halftone image using the post-dithering technology, which is implemented at high efficiency and used to improve the quality of the halftone image output.

In one embodiment, a halftone image generation method used in an image processing system for generating a halftone image is provided. The image processing system comprises a quantizer, a subtracter, a post-dithering module and an adder. The method comprise the steps of: receiving, by the quantizer, an original image comprising original pixels having original pixel values and generating a quantized image comprising quantized pixels having quantized pixel values according to a predetermined threshold; subtracting, by the subtracter, the quantized pixel values from the original pixel values so as to generate quantization error values; performing, by the post-dithering module, a post-dithering process to generate dither values by using the quantization error values; and adding, by the adder, the quantized pixel values of the quantized image and the dither values and generating the halftone image comprising halftone pixels having halftone pixel values.

In another embodiment, an image processing system for generating a halftone image is provided. The image processing system includes a quantizer, a subtracter, a post-dithering module and an adder. The quantizer receives an original image comprising original pixels having original pixel values and generating a quantized image comprising quantized pixels having quantized pixel values according to a predetermined threshold. The subtracter coupled to the quantizer subtracts the quantized pixel values from the original image pixel values so as to generate quantization error values. The post-dithering module coupled to the subtracter performs a post-dithering process to generate dither values by using the quantized error values and the adder coupled to the post-dithering module and the quantizer adds the quantized pixel values of the quantized image and the dither values and generates the halftone image comprising halftone pixels having halftone pixel values.

Halftone image generation methods and systems may take the form of a program code embodied in a tangible media. When the program code is loaded into and executed by a machine, the machine becomes an apparatus for practicing the disclosed method.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

I. SYSTEM ARCHITECTURE

The invention relates to an image processing method, in which post-dithering technology of higher implementation efficiency is used to convert the original image of a grayscale into a halftone image.

Figure 1A:
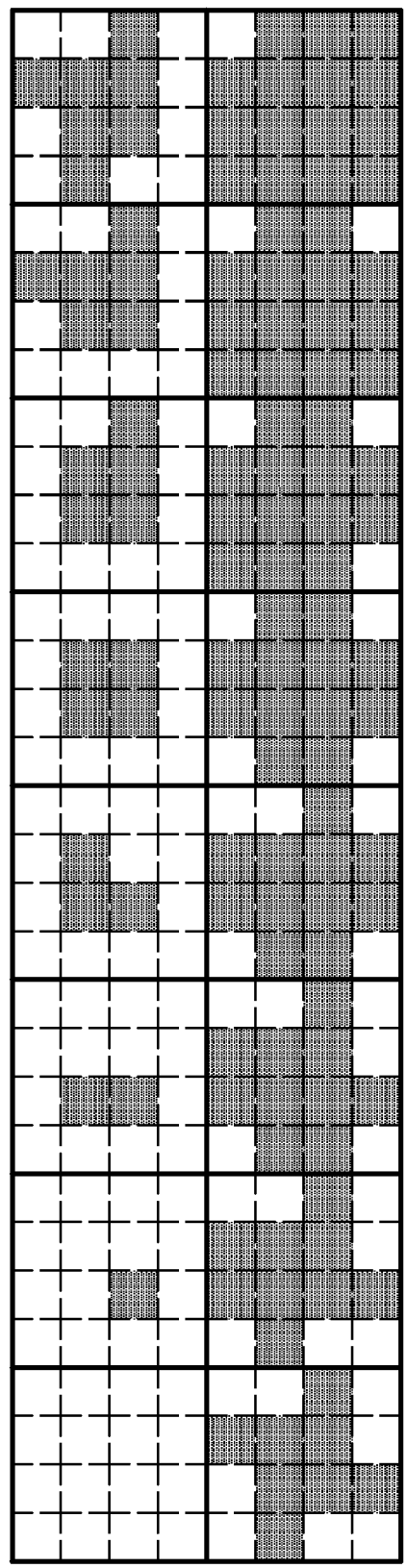
FIG. 1(a) is a 4×4 clustered-dot ordered dithering pattern of prior art.
Figure 1B:
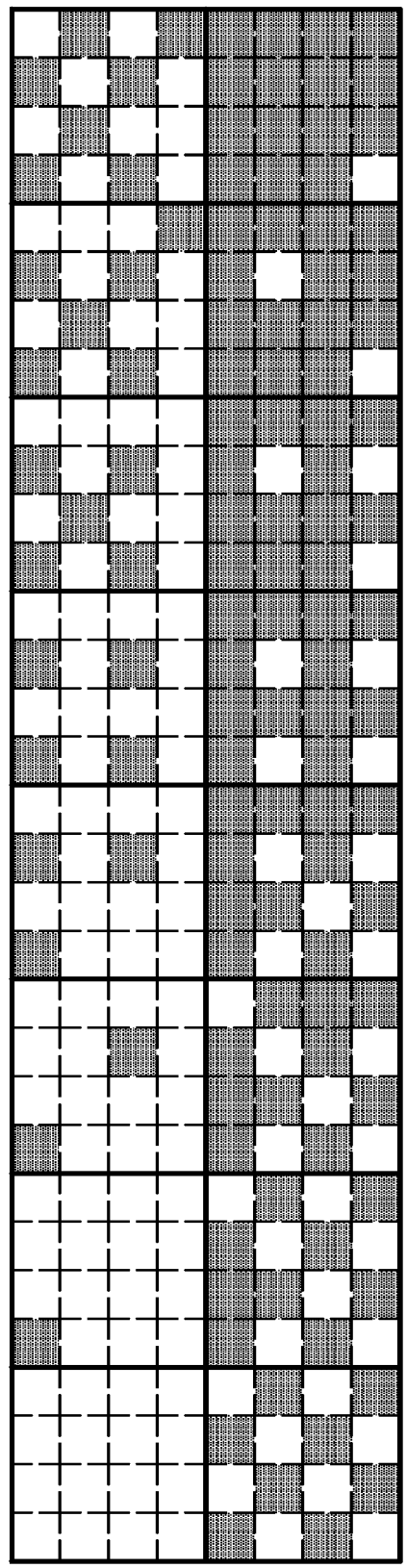
FIG. 1(b) is a 4×4 dispersed-dot ordered dithering pattern of prior art.
Figure 2:
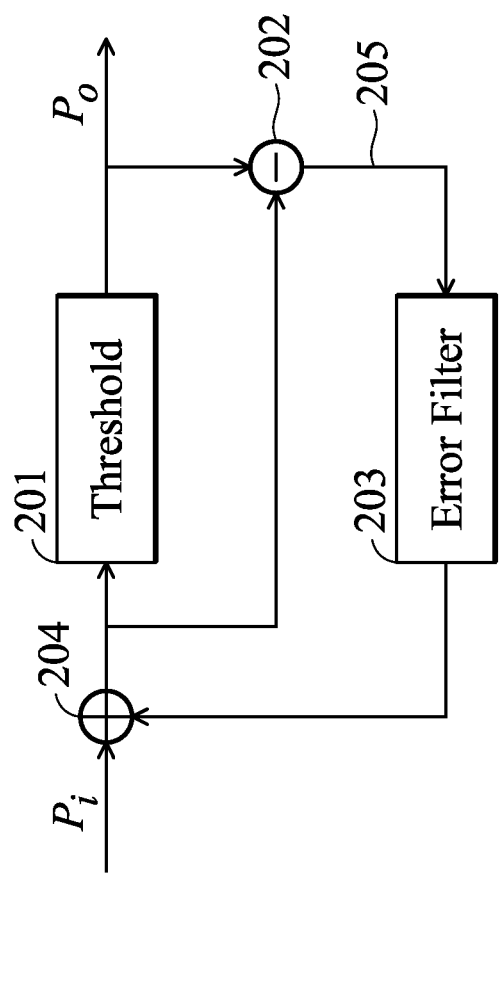
FIG. 2 is a block diagram of a system of processing an error diffusion halftone image of prior art.
Figure 3:
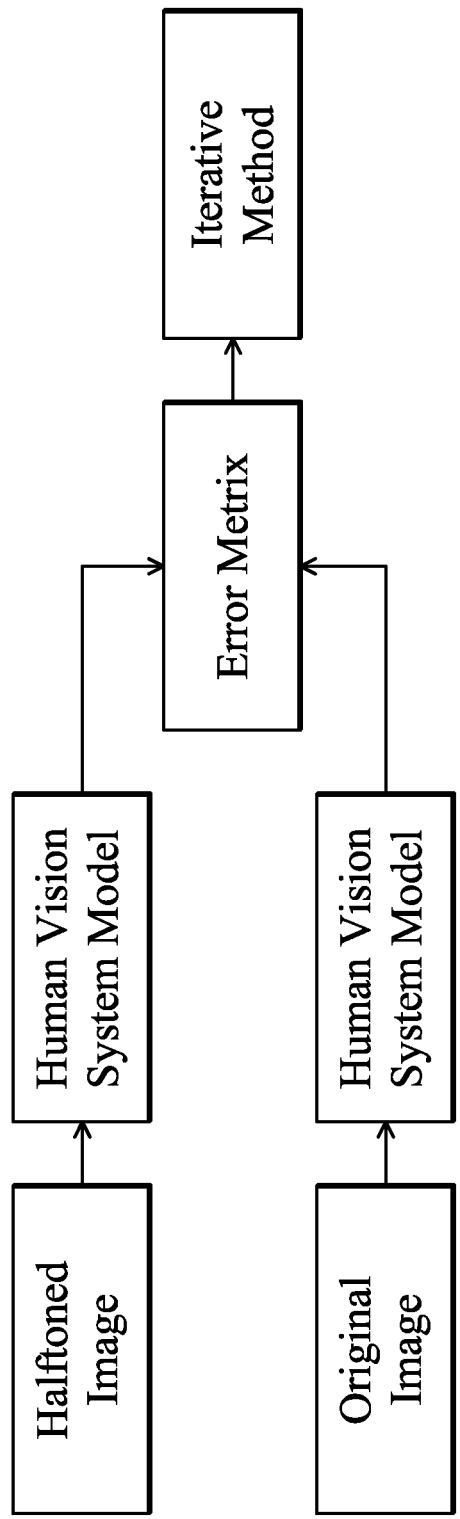
FIG. 3 is block diagram of a system of processing an iterative optimization halftone image of prior art.
Figure 4:
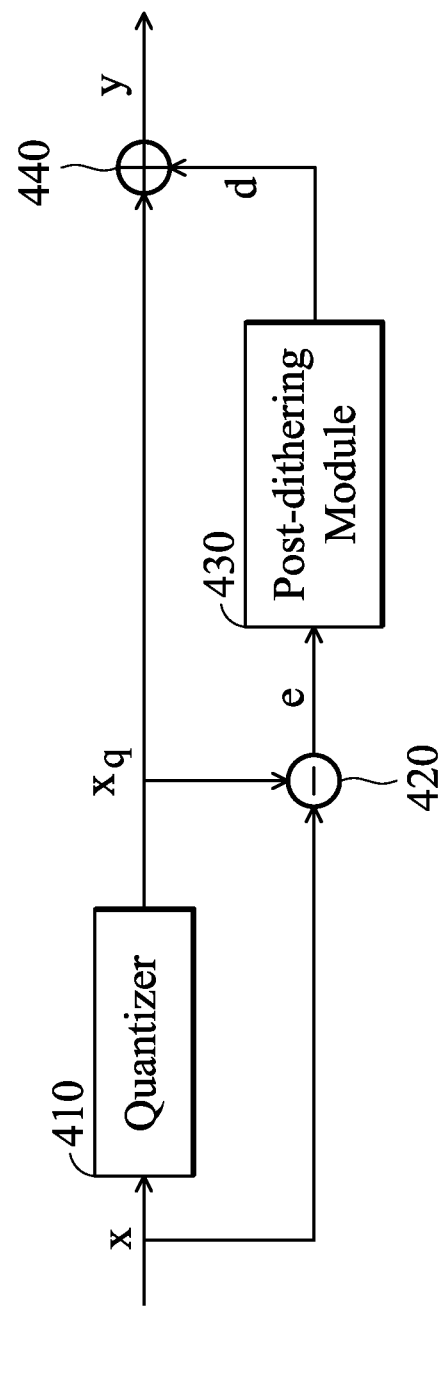
FIG. 4 is a block diagram of an image processing system for generating a halftone image according to an embodiment of the invention.

An image processing system for generating a halftone image according to the invention is illustrated in the following. FIG. 4 shows a block diagram for illustrating an image processing system 400 for generating halftone images according to an embodiment of the invention. The image processing system 400 processes an original image x to produce a halftone image. The image processing system 400 includes a quantizer 410, a subtracter 420, a post-dithering module 430 and an adder 440.

The quantizer 410 has a first input terminal to receive the original image x comprising original pixels having original pixel values and generate a quantized image $x_q$ comprising quantized pixels having quantized pixel values according to a predetermined threshold T.

The subtracter 420 is coupled to the quantizer 410 and has a first input terminal to receive the original image x. The subtracter 420 subtracts the quantized pixel values of the quantized image $x_q$ from the original image pixel values of the original image x so as to generate a quantization error e.

The post-dithering module 430 is coupled to the subtracter 420 and performs a post-dithering process to generate a dither matrix d comprising dither values by using the quantized error e.

The adder 440 is coupled to the post-dithering module 430 and the quantizer 410. The adder 440 adds the quantized pixel values of the quantized image $x_q$ to the dither values of the dither matrix d and generates the halftone image y which comprises halftone pixels having halftone pixel values.

In this embodiment, the proposed post-dithering process comprising an algorithm focuses on minimizing the mean-square-error (MSE) of the visual error of the halftone image. Mathematically, the cost function of the minimum of the MSE of the visual error $e_v$ can be written as:

$$\text{Min}\, E\{e_v^2\} = \text{Min}\left(\sum_{i=1}^{I}\sum_{j=1}^{J}(x_q(i,j) + d(i,j) - x(i,j)) * v(i,j)\right)^2 \quad (1)$$

subject to $d(i, j) = \{0, \pm T\}$.

In this embodiment, assume that the original image size is I×J and the original image x consists of a two-dimension (2D) array of pixels (i, j), where i, j are a positive integer and indicate i-th row and j-th column of the original image x. The visual error $e_v$ is the convolution sum of the modulation transfer function (MTF) of the human eye v and the error between the original image x and the halftone image y. The dither values of the dither matrix d should be subjected to an interval T between adjacent gray levels.

However, as the modulation transfer function of the human eye v is a low-past filter, the visual error $e_v$ in low frequencies is easily perceived by the eye, and the error $e_v$ in high frequencies may be not noted. Therefore, the modified algorithm focuses on minimizing the error in a local area to replace the modulation transfer function of the human eye v. The original image x is divided into many non-overlapping local areas in size M×N, and each local area is a matrix consisting of a two-dimension array of pixels (m, n), where m and n are a positive integer and indicate an m-th row and n-th column of the matrix. The cost function in (1) can be modified as:

$$\text{Min}\, E\{e_{local}^2\} = \text{Min}\left(\sum_{m=1}^{M}\sum_{n=1}^{N}(x_q(m,n) - x(m,n) + d(m,n))\right)^2 \quad (2)$$

subject to $d(m, n) = \{0, \pm T\}$.

where $e_{local}$ is the error of the M×N local area. By minimizing the modulation transfer function of local error, the cost function in (2) decreases the number of errors in low frequencies.

II. POST-DITHERING PROCESS

A pseudo-code portion describing the cost function in (2) is implemented by a numerical iterative method and is shown below.

```
while k ≤ M×N
    if |e_local| < T/2
        break;
    elseif e_local ≥ T/2
        (m, n) = max(x_local + d_local);
        d_local(m, n) = −T;
        e_local = e_local − T;
    elseif e_local ≤ − T/2
        (m, n) = max(x_local + d_local);
        d_local(m, n) = T;
        e_local = e_local + T;
    end
    k = k + 1;
end
```

Figure 5:
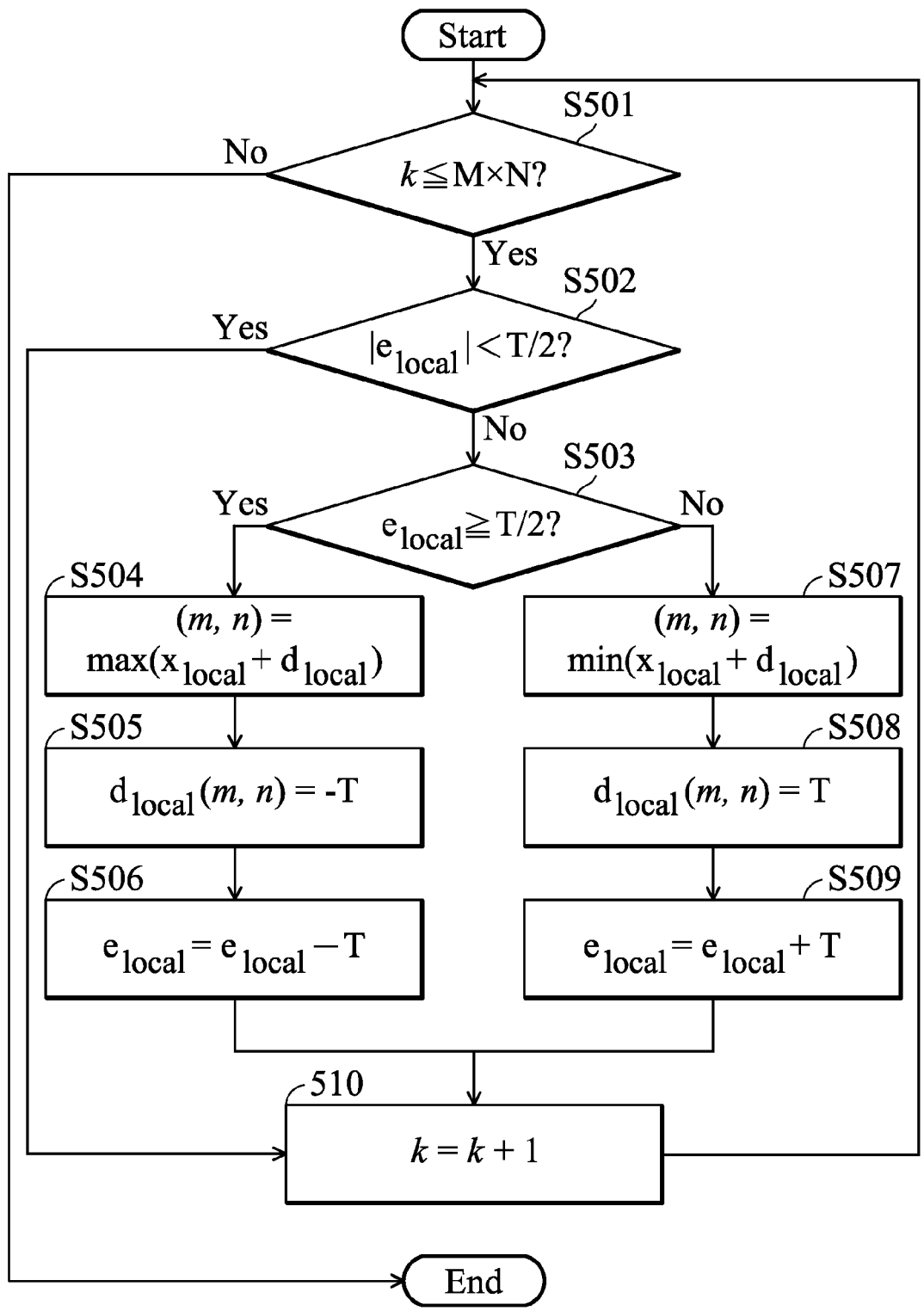
FIG. 5 is a flowchart for illustrating a post-dithering process for generating a dither matrix according to an embodiment of the invention.

Please refer to the pseudo-code portion and FIG. 5, FIG. 5 is a flowchart for illustrating the pseudo-code portion for generating a dither matrix $d_{local}$ according to an embodiment of the invention. The proposed post-dithering process progressively decreases the local error $e_{local}$ in a local area of the original image $x_{local}$ by allocating the dots to be dithered in a dither matrix $d_{local}$, and the decreasing step is the predetermined threshold T between adjacent gray levels.

First, given a local area of the original image $x_{local}$, a counter k is initialized to a value of 1 and a dither matrix $d_{local}$ is initialized to a null matrix. In step S501, it is determined whether the counter k is smaller than or equal to the number M×N. When the counter k is smaller than or equal to the number M×N, step S502 is executed; otherwise ("No" in step S501), the post-dithering process will be terminated and the quantized image $x_q$ is processed completely.

In step S502, a summation of the entries of the quantization error $e_{local}$ is determined. When the summation of the quantization error $e_{local}$ is greater than half of negative predetermined threshold T or smaller than half of the predetermined threshold T ("No" in step S502), then the step S503 is executed. When the summation of the quantization error $e_{local}$ is between half of negative predetermined threshold T and half of the predetermined threshold T ("Yes" in step S502), the summation of the quantization error $e_{local}$ can not be minimized further and step S510 is executed.

In step S503, it is determined whether the summation of the entries of the quantization error $e_{local}$ is greater than or equal to a half of the predetermined threshold T. If so ("Yes" in step S503), in step S504, an entry (in, n) is found which is the maximum value after adding the quantization error $e_{local}$ to the dither matrix $d_{local}$. In step S505, the entry (m, n) is chosen as the dot to be dither in the dither matrix $d_{local}$. Therefore, the entry (m, n) of the dither matrix $d_{local}$ is processed to obtain a negative predetermined threshold −T, i.e., the negative predetermined threshold −T is entry (m, n) of the dither matrix $d_{local}$ ($d_{local}$(m, n)=−T). In step S506, the summation of the entries of the quantization error $e_{local}$ is determined to equal the summation of the entries of the quantization error $e_{local}$ minus the predetermined threshold T ($e_{local}=e_{local}$−T).

In step S503, if the summation of the entries of the quantization error $e_{local}$ is smaller than or equal to a half of the negative predetermined threshold −T ("No" in step S503), step S507 is executed. In step S507, an entry (m, n) is found which is the minimum value after adding the quantization error $e_{local}$ to the dither matrix $d_{local}$. In step S508, the entry (m, n) is chosen as the dot to be dither in the dither matrix $d_{local}$. Therefore, the entry (m, n) of the dither matrix $d_{local}$ is processed to obtain a predetermined threshold T, i.e., the predetermined threshold T is entry (m, n) of the dither matrix $d_{local}$ ($d_{local}$(m, n)=T). In step S509, the summation of the entries of the quantization error $e_{local}$ is determined to equal the summation of the entries of the quantization error $e_{local}$ minus the predetermined threshold T ($e_{local}=e_{local}$+T). In step S510, 1 is added to the counter k and the steps return to step S501 until the counter k is greater than the number M×N.

III. EXPERIMENTAL RESULTS AND DISCUSSIONS

Figure 6A:
FIG. 6(a)~6(c) illustrate the original images according to an embodiment of the invention.
Figure 6B:
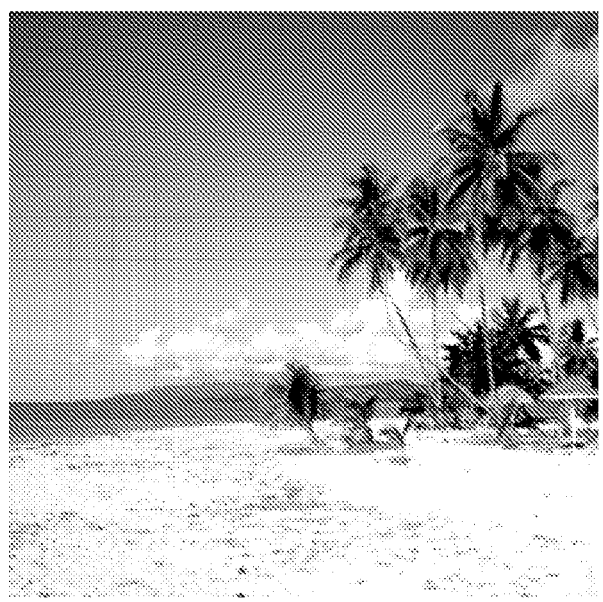
Figure 6C:
Figure 6D:
FIG. 6(d)~6(f) illustrate the quantized images according to an embodiment of the invention.
Figure 6E:
Figure 6F:
Figure 6G:
FIG. 6(g)~6(i) illustrate the halftoned images according to an embodiment of the invention.
Figure 6H:
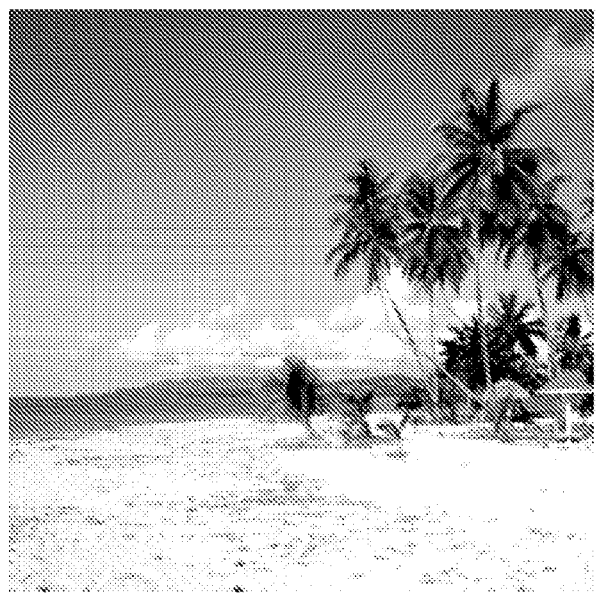
Figure 6I:

FIGS. 6(a), 6(b) and 6(c) shows the Lena image, the Beach image and the Building image at 300 dots per inch (dpi) respectively. These original images used in the experiments have 256 gray levels and a resolution of 500×500 pixels. In this embodiment, a uniform quantizer of 16 gray levels is employed. 4-bits quantized images are shown in FIGS. 6(d), 6(e) and 6(f). The proposed post-dithering process uses a 2×2 local area for $x_{local}$. By adding the dithering matrix $d_{local}$ generated by the proposed post-dithering process, the halftoned images y shown in FIGS. 6(g), 6(h) and 6(i) are obtained. As shown in FIG. 6(a)~6(i), obviously, using the proposed post-dithering process may accomplish higher image quality.

The MSE of the visual error in (1) is used to estimate the image quality. The MTF of the human eye is used to employ the v in (1), which is represented as:

$$v(f_r)=2.6(0.0192+0.114f_r)\exp\{-(0.114f_r)^{1.1}\},$$

where $f_r$ is the rms value of the horizontal and vertical frequency in units of cycles per degree (CPD). The experimental results for visual error with different sizes for the local area $s_x$ are shown in TABLE. 1.

TABLE 1

Comparison of Visual Error (dB)

| | Quantize r | Proposed Post-dithering Process | | |
|---|---|---|---|---|
| $s_x$ | NA | 2 × 2 | 3 × 3 | 4 × 4 |
| Lena | 31.11 | 22.17 | 22.97 | 24.56 |
| Beach | 33.60 | 22.53 | 23.01 | 24.71 |
| Building | 34.67 | 23.32 | 23.62 | 25.60 |

As expected, in TABLE. 1, the proposed post-dithering process is found to achieve lower visual error and achieve the best overall image quality. Notice that the visual error of using the size for the 2×2 local area is better than the size which is bigger than 2×2. Therefore, using the smaller size for the local area may achieve better image quality.

IV. CONCLUSIONS

According to the halftone images generation methods and related imaging processing systems of the invention, the proposed post-dithering process that targets the original grayscale image applications is used to carry out post-dithering processing to obtain halftone images. Of which, the local areas and the dither matrixes take into account the human visual characteristics in the post-dithering process in order to carry out image quality assessments. Therefore, when people look at the generated halftone images, they will have a more comfortable feeling. Moreover, the halftone image generation method of the invention provides high image quality, lower bit operation and lower computation complexity. The high efficiency halftone imaging generating method is especially suitable to be implemented in or associated with a variety of electronic devices such as, but not limited to, mobile telephones, wireless devices, personal data assistants (PDAs), hand-held or portable computers, and electrophorotic displays.

It is understood that although each of the aforementioned modules or units of the invention has been illustrated as a single component of the system, two or more such components can be integrated together, thereby decreasing the number of the components within the system. Similarly, one or a multiple of the above components can be separately used, thereby increasing the number of the components within the system. In addition, the modules or the unit components of the invention can be implemented by any hardware, firmware, or software methods or combination thereof.

Systems and methods thereof, or certain aspects or portions thereof, may take the form of a program code (i.e., executable instructions) embodied in tangible media, such as floppy diskettes, CD-ROMS, hard drives, or any other machine-readable storage medium, wherein, when the program code is loaded into and executed by a machine, such as a computer, the machine thereby becomes an apparatus for practicing the methods. The methods may also be embodied in the form of a program code transmitted over some transmission medium, such as electrical wiring or cabling, through fiber optics, or via any other form of transmission, wherein, when the program code is received and loaded into and executed by a machine, such as a computer, the machine becomes an apparatus for practicing the disclosed methods. When implemented on a general-purpose processor, the program code combines with the processor to provide a unique apparatus that operates analogously to application specific logic circuits.

While the invention has been described by way of example and in terms of preferred embodiment, it is to be understood that the invention is not limited thereto. To the contrary, it is intended to cover various modifications and similar arrangements (as would be apparent to the skilled in the art). Therefore, the scope of the appended claims should be accorded to the broadest interpretation so as to encompass all such modifications and similar arrangements.

What is claimed is:

1. A halftone image generation method used in an image processing system for generating a halftone image, wherein the image processing system comprises a quantizer, a subtracter, a post-dithering module and an adder, comprising:

receiving, by the quantizer, an original image comprising original pixels having original pixel values and generating a quantized image comprising quantized pixels having quantized pixel values according to a predetermined threshold;

subtracting, by the subtracter, the quantized pixel values from the original pixel values so as to generate quantization error values;

performing, by the post-dithering module, a post-dithering process to generate dither values by using the quantization error values;

adding, by the adder, the quantized pixel values of the quantized image and the dither values and generating the halftone image comprising halftone pixels having halftone pixel values;

dividing, by the image processing system, the original image into a plurality of local areas with a local area size, wherein the local area is a matrix consisting of a two-dimension array of pixels (m, n), where m and n are a positive integer and indicate an m-th row and n-th column of the matrix;

performing, by the post-dithering module, the post-dithering process for each of the local areas, wherein the steps that the post-dithering module performs for the post-dithering process to generate a dither matrix consisting of the dither values with the local area size by using a quantization error matrix consisting of the quantization error values with the local area size comprise:

(a) initialing the dither values to zero;

(b) determining a summation of the quantization error values;

(c) if the summation of the quantization error values is greater than half of negative predetermined threshold and smaller than half of the predetermined threshold, stopping the post-dithering process;

(d) if the summation of the quantization error values is greater than or equal to a half of the predetermined threshold, finding an entry (m, n) which is the maximum value after adding the quantization error matrix to the dither matrix, determining that the entry (m, n) of the dither matrix is a negative predetermined threshold and determining that the summation of the quantization error values equals the summation of the quantization error values minus the predetermined threshold;

(e) if the summation of the quantization error values is smaller than or equal to a half of negative predetermined threshold, finding an entry (m, n) which is the minimum value after adding the quantization error matrix to the dither matrix, determining that the entry (m, n) of the dither matrix is a predetermined threshold and determining that the summation of the quantization error values equals the summation of the quantization error values plus the predetermined threshold; and (f) repeating steps (c)-(e) until the post-dithering process is stopped, to thereby generate the dither matrix.

2. The halftone image generation method of claim 1, wherein the original image is a grayscale image.

3. The halftone image generation method of claim 1, wherein the halftone image generation method is used in a hand-held electronic device.

4. An image processing system for generating a halftone image, comprising:

a quantizer, receiving an original image comprising original pixels having original pixel values and generating a quantized image comprising quantized pixels having quantized pixel values according to a predetermined threshold;

a subtracter coupled to the quantizer, subtracting the quantized pixel values from the original image pixel values so as to generate quantization error values;

a post-dithering module coupled to the subtracter, performing a post-dithering process to generate dither values by using the quantized error values;

an adder coupled to the post-dithering module and the quantizer, adding the quantized pixel values of the quantized image and the dither values and generating the halftone image comprising halftone pixels having halftone pixel values, wherein the image processing system further divides the original image into a plurality of local areas with a local area size and the post-dithering module performs the post-dithering process for each of the local areas, wherein the local area is a matrix consisting of a two-dimension array of pixels (m, n), where m and n are a positive integer and indicate m-th row and n-th column of the matrix, wherein the post-dithering module performs the post-dithering process to generate a dither matrix consisting of the dither values with the local area size by using a quantization error matrix consisting of the quantization error values with the local area size comprising the steps of:
(a) initialing the dither values to zero;
(b) determining a summation of the quantization error values;
(c) if the summation of the quantization error values is greater than half of negative predetermined threshold and smaller than half of the predetermined threshold, stopping the post-dithering process;
(d) if the summation of the quantization error values is greater than or equal to a half of the predetermined threshold, finding an entry (m, n) which is the maximum value after adding the quantization error matrix to the dither matrix, determining that the entry (m, n) of the dither matrix is a negative predetermined threshold and determining that the summation of the quantization error values equals the summation of the quantization error values minus the predetermined threshold;
(e) if the summation of the quantization error values is smaller than or equal to a half of negative predetermined threshold, finding an entry (m, n) which is the minimum value after adding the quantization error matrix to the dither matrix, determining that the entry (m, n) of the dither matrix is a predetermined threshold and determining that the summation of the quantization error values equals summation of the quantization error values plus the predetermined threshold; and
(f) repeating steps (c)-(e) until the post-dithering process is stopped, to thereby generate the dither matrix.

5. The image processing system of claim 4, wherein the original image is a grayscale image.

6. The image processing system of claim 4, wherein the image processing system is used in a hand-held electronic device.

7. A computer product which is embodied on a non-transitory computer readable medium which, when executed, causes a device to perform a halftone image generation method used in a system for generating a halftone image, and wherein the method comprises:
receiving an original image comprising original pixels having original pixel values and generating a quantized image comprising quantized pixels having quantized pixel values according to a predetermined threshold;
subtracting the quantized pixel values from the original pixel values so as to generate a quantization error values;
performing a post-dithering process to generate the dither values by using the quantization error values;
adding the quantized pixel values of the quantized image and the dither values and generating the halftone image comprising halftone pixels having halftone pixel values;
dividing the original image into a plurality of local areas with a local area size and performing the post-dithering process for each of the local areas, wherein the local area is a matrix consisting of a two-dimension array of pixels (m, n), where m and n are a positive integer and indicate an m-th row and n-th column of the matrix, wherein the steps that the post-dithering process is performed to generate a dither matrix consisting of the dither values with the local area size by using a quantization error matrix consisting of the quantization error values with the local area size comprises:
(a) initialing the dither values to zero;
(b) determining a summation of the quantization error values;
(c) if the summation of the quantization error values is greater than half of negative predetermined threshold and smaller than half of the predetermined threshold, stopping the post-dithering process;
(d) if the summation of the quantization error values is greater than or equal to a half of the predetermined threshold, finding an entry (m, n) which is the maximum value after adding the quantization error matrix to the dither matrix, determining that the entry (m, n) of the dither matrix is a negative predetermined threshold and determining that the summation of the quantization error values equals the summation of the quantization error values minus the predetermined threshold;
(e) if the summation of the quantization error values is smaller than or equal to a half of negative predetermined threshold, finding an entry (m, n) which is the minimum value after adding the quantization error matrix to the dither matrix, determining that the entry (m, n) of the dither matrix is a predetermined threshold and determining that the summation of the quantization error values equals summation of the quantization error values plus the predetermined threshold; and
(f) repeating steps (c)-(e) until the post-dithering process is stopped, to thereby generate the dither matrix.

8. The computer product of the claim 7, wherein the original image is a grayscale image.

9. The computer product of the claim 7, wherein the device is a hand-held electronic device.

* * * * *